United States Patent [19]

Brzozowski et al.

[11] 4,074,991

[45] * Feb. 21, 1978

[54] METHOD OF PREPARING BORIC ACID-CONTAINING GLASS BATCH

[75] Inventors: Stanley F. Brzozowski, Coraopolis; Joseph E. Cooper, Brackenridge, both of Pa.

[73] Assignee: PPG Industries, Inc., Pittsburgh, Pa.

[*] Notice: The portion of the term of this patent subsequent to Feb. 21, 1995, has been disclaimed.

[21] Appl. No.: 739,885

[22] Filed: Nov. 8, 1976

[51] Int. Cl.² ............................................... C03B 5/16
[52] U.S. Cl. .......................................... 65/27; 65/134; 65/136; 106/50; 106/54
[58] Field of Search ..................... 106/50, 54, DIG. 8; 65/27, 134, 136

[56] References Cited
U.S. PATENT DOCUMENTS

| 2,334,961 | 11/1943 | Schoenlaub | 65/134 X |
| 2,366,473 | 1/1945 | Bair | 106/50 X |
| 2,976,162 | 3/1961 | Ekdahl | 65/134 X |
| 3,001,881 | 9/1961 | Slayter | 65/134 X |
| 3,274,006 | 9/1966 | McKinnis | 106/50 |
| 3,287,095 | 11/1966 | Procter et al. | 65/2 |
| 3,880,639 | 4/1975 | Bodner et al. | 64/134 |
| 3,887,671 | 6/1975 | Metzger | 264/43 |
| 3,914,364 | 10/1975 | Engelleitner et al. | 264/117 |

Primary Examiner—Robert L. Lindsay, Jr.
Attorney, Agent, or Firm—Alan T. McDonald; John E. Curley

[57] ABSTRACT

A process is described for preparing boric acid-containing glass batch compositions suitable for the preparation of glass fibers in which the batch, prior to its introduction into the furnace, is pelletized by adding water in sufficient quantities to maintain an adequate balling action and thus provide pellets in a form such that preheating by direct contact with flue gases does not cause deterioration of the pellets.

6 Claims, 1 Drawing Figure

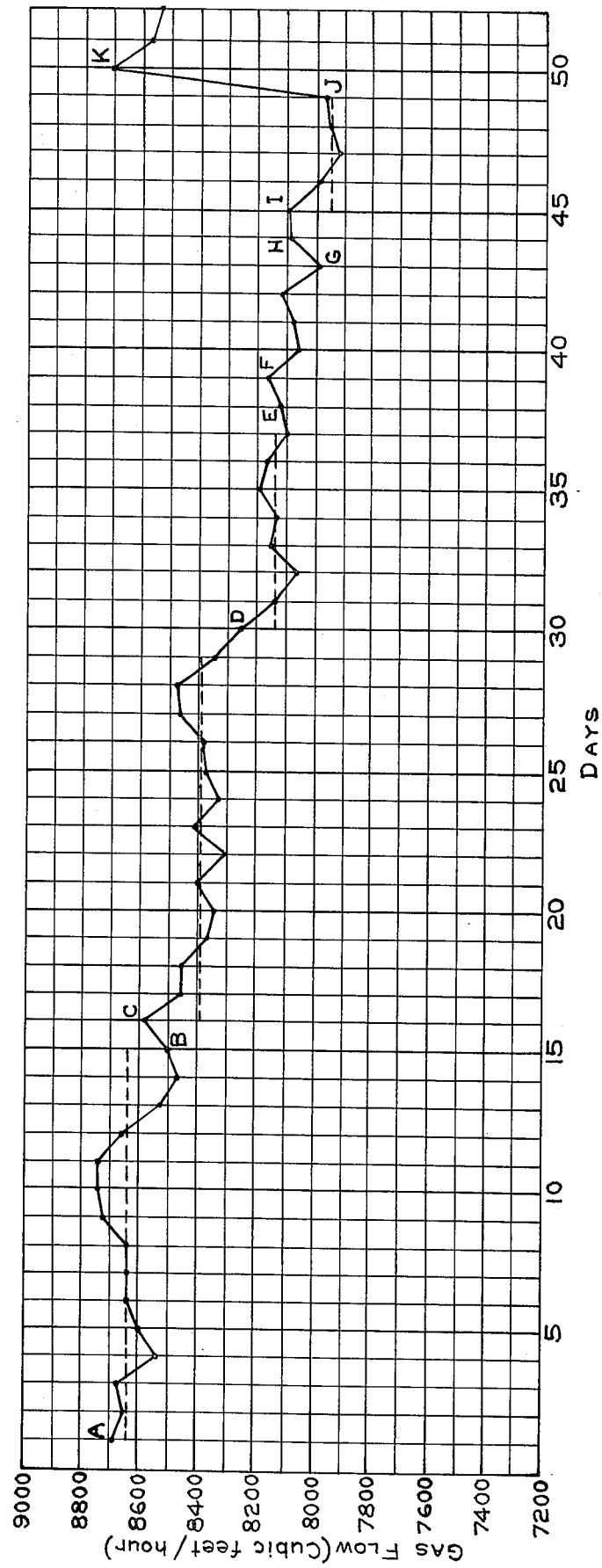

METHOD OF PREPARING BORIC ACID-CONTAINING GLASS BATCH

BACKGROUND OF THE INVENTION

Fiber glass batches, unlike soda-lime glass batches and other commercial batches utilized to make containers and flat glass, are fed to fiber glass melting furnaces in an extremely fine condition, i.e., almost all batch particles are less than 20 mesh, with the majority being less than 200 mesh. Because of the fineness of the batch ingredients, dusting is encountered in fiber glass batch melting furnaces. In addition, fiber glass batches contain considerable quantities of boron-containing materials and other rather expensive ingredients, some of which are lost in the stack gases should dusting occur during feeding. Further, some of these batch materials volatilize into the stack gases as they are melted. By cohesively binding batch ingredients of the fineness normally encountered in a fiber glass batch, reduced dusting and volatilization of the batch ingredients and the concomitant reduction in the loss of expensive ingredients can be achieved. In addition, by providing fiber glass batch in pelletized form, advantage can be taken of the sensible heat contained in the furnace flue gases to preheat the fiber glass batch pellets prior to feeding them to the glass melting furnace. Further, the close contact between the particles within the pellets improves their heat transfer characteristics and thus results in faster melting, improved energy efficiency and reduced furnace wear.

Considerable activity has taken place in recent years and particularly in relation to the preparation of soda-lime glass batches in which the batch ingredients have been pelletized for feed to glass melting furnaces. Thus, a recent U.S. Pat. No. 3,880,639 describes the utilization of an agglomerated soda-lime glass batch in which the pellets are preheated via direct heat exchanges prior to feeding them to a glass melting furnace.

Activity has also occurred in the preparation of fiber glass batches in that glass batches have been prepared with various binding materials for the preparation of briquettes for feeding to glass melting furnaces. U.S. Pat. No. 2,976,162 describes a process of this nature. In other patent literature involved in the preparation of fiber glass type batches, special treatments have been applied to the glass batch to provide for prereaction of glass batch ingredients prior to feeding them to the glass melting furnace. A process of this character is described in U.S. Pat. No. 3,001,881. Still further, the glass batch ingredients themselves have been carefully selected to provide boron-containing glass batch materials of specific character to help eliminate some of the foaming problems occurring during melting utilizing high boron-containing glass batches such as are encountered in the fiber glass industry. A patent describing one such process is U.S. Pat. No. 3,287,095.

THE PRESENT INVENTION

In accordance with the present invention, boron-containing fiber glass batch pellets utilizing boric acid as the boron source are prepared by introducing the batch ingredients in appropriate proportions into a pelletizing zone, such as an inclined rotating disc pelletizer, as is shown in U.S. Pat. No. 3,914,364, which is incorporated herein by reference, and adding to the batch ingredients as they are rotated on the pelletizer sufficient water to agglomerate and support the continuous production of glass batch pellets of a desired size. The pellets may range in nominal diameter, for example, from about 0.125 to about 1.00 inch (0.3175 to 2.54 centimeters) and preferably between about 0.375 and 0.625 inch (0.9525 and 1.5875 centimeters). Sufficient water is added to bind the batch ingredients together and provide pellets preferably containing approximately 5 to 22 percent by weight free water. Most preferably, the water is added to provide approximately 11 to 13 percent by weight free water. The pellets after formation are dried at temperatures preferably from about 220° F. (104.4° C.) or less up to about 1,000° F. (537.8° C.) or more for a sufficient period of time to provide a free water content preferably of below about 1 percent by weight. Hard, substantially non-dusting pellets are thus produced. The hard, non-dusting pellets thus formed can be fed to a glass melting furnace and exposed to conditions in excess of 2,700° F. (1,482.2° C.) without any explosions of the pellets occurring.

BRIEF DESCRIPTION OF THE DRAWING

The drawing is a graph representing energy consumption for a glass fiber melting tank using the pellets of the present invention.

DETAILED DESCRIPTION OF THE INVENTION

Typical "E" glass type boron containing glass fiber forming batch compositions, such as those illustrated in U.S. Pat. No. 2,334,961, which is incorporated herein by reference, comprise silica, clay, limestone, coal, fluorspar, sodium sulfate, ammonium sulfate and boric acid. There is no caustic soda present in the compositions. These glass batch ingredients, when prepared in accordance with the instant invention, are believed to undergo several chemical reactions during their deposition on the pelletizing disc and while water in the quantity sufficient to produce the pellets is being added to the ingredients and during the drying of the pellets. The primary reactions involved in the preparation of the pellets in accordance with the instant invention are believed to be as follows:

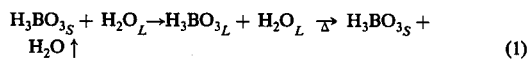

$$H_3BO_{3S} + H_2O_L \rightarrow H_3BO_{3L} + H_2O_L \rightleftharpoons H_3BO_{3S} + H_2O\uparrow \quad (1)$$

$$2 H_3BO_3 \rightleftharpoons B_2O_3 + 3 H_2O\uparrow \quad (2)$$

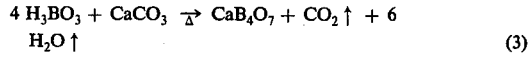

$$4 H_3BO_3 + CaCO_3 \rightleftharpoons CaB_4O_7 + CO_2\uparrow + 6 H_2O\uparrow \quad (3)$$

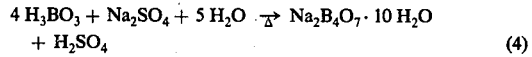

$$4 H_3BO_3 + Na_2SO_4 + 5 H_2O \rightleftharpoons Na_2B_4O_7 \cdot 10 H_2O + H_2SO_4 \quad (4)$$

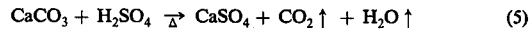

$$CaCO_3 + H_2SO_4 \rightleftharpoons CaSO_4 + CO_2\uparrow + H_2O\uparrow \quad (5)$$

In reaction (1) the boric acid and water react to dissolve the boric acid and then the boric acid is recrystallized as shown in the equation. The recrystallized boric acid is dehydrated during the drying step to drive water off, as can be seen in equation (2). Some of the boric acid itself, during the drying of the pellets, reacts with the calcium carbonate present to form hydrated calcium pyroborate, carbon dioxide and water in accordance with equation (3). Boric acid also reacts with the sodium sulfate present in the batch in accordance with equation (4) to form hydrated sodium tetraborate and sulfuric acid. Limestone and sulfuric acid may also react to form calcium sulfate, carbon dioxide and water, in accordance with equation (5).

Regardless of the reactions that take place, hard, non-dusting pellets are produced by the drying operation. The pellets may be dried slowly at temperatures of 220° F. (104.4° C.) or less or they may be dried somewhat more rapidly at temperatures up to 1000° F. (537.8° C.) or more until they reach a non-dusting, hard state. The only constraint on the uppermost drying temperature for a given pellet is its melting temperature which, of course, will vary depending upon its exact composition.

Pellets produced in accordance with the practice of the present invention thus provided to a glass melting furnace for the production of glass fibers are considerably less dusty than those the loose batch ingredients conventionally employed. Further, since the boric acid is an excellent fluxing agent, the wetting of the boric acid upon its intimate contact with all batch ingredients, in addition to causing the reactions as indicated hereinabove in equations (1) through (5), provides for intimate contact of the boron contained in the batch with all of the other batch grains present. This assists in rapidly melting the silica and alumina constituents of the glass batch, which, as will be readily understood, are the most difficult ingredients to dissolve.

The pellets of the present invention may be preheated prior to their addition to the glass melting furnace such as, for example, by passing them through the flue gases of the furnace, or passing the gases through a bed of the pellets. In addition to preheating the pellets and thus reducing the amount of furnace input energy needed to melt them, this passage of flue gsses through a bed of pellets may cause a reduction of air pollution from the flue gases by removing via a filtering action at least part of the harmful materials, such as $F_2$ and $B_2O_3$, from the flue gases. Utilizing hot flue gases at temperatures typically in the range of about 800° F. to 2850° F. (426.7° C. to 1565.6° C.), pellets can be preheated to temperatures of about 200° F. to 1500° F. (93.3° C. to 815.6° C.) to recover sensible heat and assist in reducing the amount of fuel needed to melt the pellets fed to the furnace.

EXAMPLE

An "E" type fiber forming glass batch comprising:

| Component | Percent by Weight |
|---|---|
| Silica | 29.665 |
| Clay | 26.930 |
| Limestone | 27.786 |
| Fluorspar | 2.336 |
| Sodium Sulfate | 0.794 |
| Ammonium Sulfate | 0.224 |
| Boric Acid | 12.181 |
| Coal | 0.084 | was combined on a disc pelletizer with sufficient water to produce pellets containing about 12 percent by weight free water. A portion of the pellets was dried at 220° F. (104.4° C.) for 196 minutes and another portion was dried at 1000° F. (537.8° C.) for 20 minutes. The pellets produced in each instance were hard and non-dusting and could be physically handled without damage.

Pellets of the above composition were produced on a production scale in the following manner:

The batch materials were weighed out to give the desired compositions. This material was then fed to a 39.37 inch (1 meter) diameter inclined rotating disc pelletizer having an angle of inclination of approximately 45° at a controlled rate of between about 400 and 1000 pounds per hour (181.4 and 453.6 kilograms per hour). Water was fed to the disc at a controlled rate of between about 54.5 and 136.4 pounds per hour (24.7 and 61.9 kilograms per hour). The pellets thus produced were dried in a gas fired oven at temperatures of about 490° F. to 525° F. (254.4° C. to 273.9° C.) for approximately 5 minutes. The dried pellets were fed to a continuous melt glass fiber forming tank at a rate of about 756 pounds per hour (342.9 kilograms per hour).

The graph in the drawing represents the energy consumption of the glass melting tank during a 52 day period. Energy consumption is measured by the total gas flow to the melting tank in cubic feet per hour consumed.

Point A on the graph represents the first day of measurements for the test. Between Point A and Point B, regular, unpelletized loose batch material was fed to the furnace. Over this 15 day span, the average energy consumption was 8,635 cubic feet per hour.

At Point B, pellets were initially added to the tank. During day 16, Point C, the glass tank reached the point where all batch material in the tank was fed to the tank from pellets.

From Point C to Point D, the pellets which were fed to the tank entered the tank at temperatures between about 140° F. and 150° F. (60° C. and 65.6° C.). During this time span, the average energy consumption was 8,397 cubic feet per hour, a reduction of 2.8 percent from the average fuel consumption for the tank using loose batch material.

During day 30, Point D, at 12 noon, and continuing until Point E, pellets having a temperature of between about 180° F. and 190° F. (82.2° C.) and 87.8° C.) were fed to the tank. The average energy consumption during this time span was 8,129 cubic feet per hour, a 5.9 percent reduction from the loose batch.

During the day between Points E and F, pellets having an average temperature of approximately 110° F. (43.3° C.) were fed to the tank.

During the day marked as Point G, one hopper of the pellets which was heated for approximately 1½ hours was fed to the tank. Similarly, one heated hopper was fed to the tank during the day marked Point H.

During the day marked Point I, and continuing to Point J, pellets heated to a temperature of between about 300° F. and 400° F. (148.9° C. and 204.4° C.) were fed to the tank. The average energy consumption during this time span was 7,952 cubic feet per hour, a 7.9 percent reduction from the loose batch.

At approximately 9:20 a.m. on day 50, Point K, loose batch was again fed to the tank. As can be seen from the graph, the average energy consumption rose back into the range between Points A and B, when loose batch was previously employed.

From the foregoing, it is clear that, by employing pellets of the present invention as the batch material for a glass fiber forming glass melt tank, significant energy savings are realized. Further, it is clear that when the pellets are preheated prior to their entry into the tank, even greater energy savings are realized.

While the present invention has been described with reference to specific embodiments thereof, it is not intended to be so limited thereby, except as set forth in the accompanying claims.

We claim:

1. A method of preparing a boric acid-containing glass fiber forming glass batch having a substantial amount of alumina therein comprising introducing boric acid-containing batch ingredients into a pelletizing zone, agglomerating the ingredients with sufficient water to produce pellets containing about 5 to 22 percent by weight free water, heating the pellets at a temperature of at least 220° F. (104.4° C.) and drying the pellets at that temperature for a period of time sufficient to thereby prevent disintegration thereof and produce hard, non-dusting pellets.

2. The method of claim 1, wherein said pelletizing zone comprises an inclined rotating disc pelletizer.

3. The method of claim 1, wherein said pellets are produced having nominal diameters of between about 0.375 and 0.625 inch (0.9525 and 1,5875 centimeters).

4. The method of claim 1 wherein the pellets are dried to about 1 percent or less by weight free water.

5. The method of claim 1 wherein the pellets are dried at a temperature between about 220° F. (104.4° C.) and 1000° F. (537.8° C.).

6. The method of claim 1 wherein the free water is approximately 11 to 13 percent by weight.

* * * * *